DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 3, 1973

909 O.G. 8

T909,011
DYEING PROCESS
John R. Schwier, Rte. 6, Kingsport, Tenn. 37660
Filed July 18, 1972, Ser. No. 272,836
Int. Cl. D06p *5/00*
U.S. Cl. 8—168
No Drawing. 9 Pages Specification

Disclosed is a process comprising contacting, under dyeing conditions, in the presence of at least 30% O.W.F. sulfamic acid, an anionic dye and an anionic dyeable fiber of a blend of 96 to 93 weight percent, based on the weight of the blend, of a polyetherester and 4 to 7 weight percent, based on the weight of the blend, of a basic nitrogen containing polymer. Using the process of the invention, the anionic dyeable fiber is dyed to deep shades, preferably at the boil under atmospheric pressure. Preferably the blend comprises about 95 percent polyetherester, wherein the polyester portion of the polyetherester is poly(ethylene terephthalate), and about 5 percent of a copolymer of 2-vinylpyridine and styrene.